United States Patent

[11] 3,564,298

[72] Inventor Ronald P. Colino
Commack, N.Y.
[21] Appl. No. 781,509
[22] Filed Dec. 5, 1968
[45] Patented Feb. 16, 1971
[73] Assignee General Instrument Corporation
Newark, N.J.
a corporation of Delaware

[54] DYNAMIC AMPLIFIER LEVEL CONVERTER
24 Claims, 5 Drawing Figs.

[52] U.S. Cl. .... 307/268, 307/255, 307/237, 307/313, 330/13
[51] Int. Cl. .... H03k 5/08, H03f 3/18
[50] Field of Search .... 330/13, 17; 307/268, 264, 255, 237, 220

[56] References Cited
UNITED STATES PATENTS
3,319,086 5/1967 Yee .... 330/13

*Primary Examiner*—Donald D. Forrer
*Assistant Examiner*—B. P. Davis
*Attorney*—James and Franklin

ABSTRACT: A pulse amplifier circuit comprises a pair of switching stages operatively connected between an input node and a signal node. Each switching stage is respectively actuated by signals derived from the leading and trailing edges of the input pulse, the signal node being charged between its two levels as a result of the alternate conduction of the switching stages. Neither switching stage is conductive in the period between the charging cycles of the signal node, the signal level at that node remaining substantially quiescent during that period.

Figure 1:
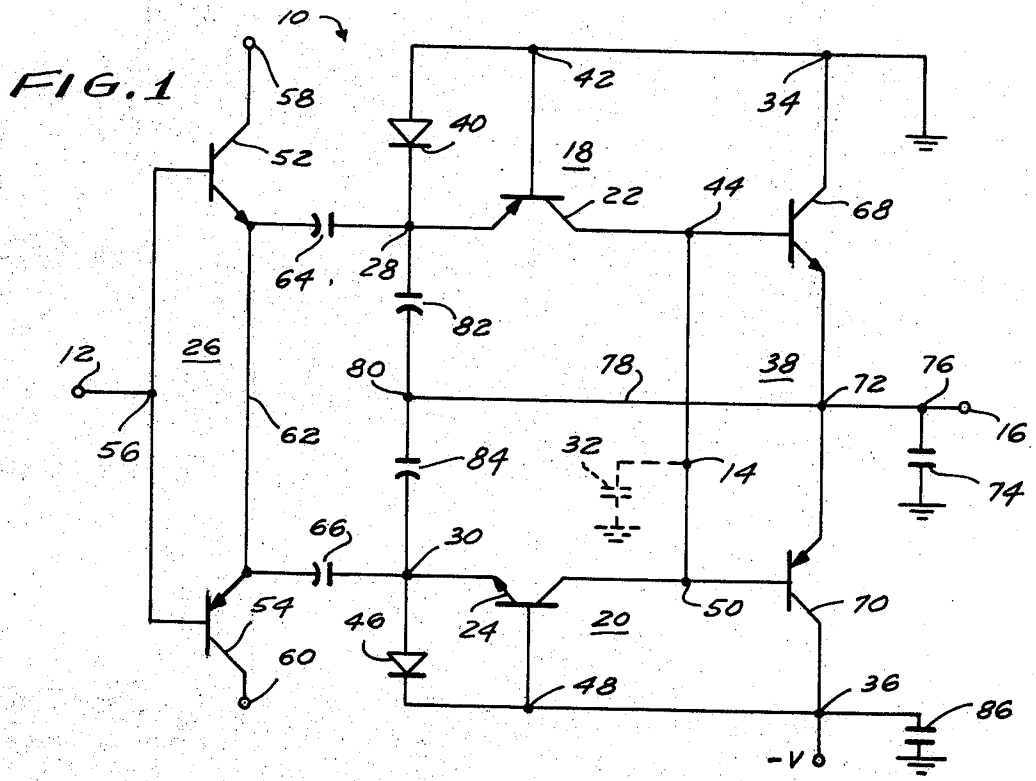

INVENTOR
RONALD P. COLINO
BY James and Franklin
ATTORNEY

DYNAMIC AMPLIFIER LEVEL CONVERTER

The present invention relates to signal amplifying circuits, and particularly to a circuit of this type of for amplifying high frequency pulses.

High frequency clock pulses are used in electronic computers to control the operation of gating and other logic circuits. In order for the clock pulses to accurately control the logic operations of the computer, it is essential that they be of sufficient magnitude and of proper purity and shape. They must be strong enough to actuate all of the very large number of logic circuits to which they may be applied in a given computer, they must be free of noise, and they must have abrupt leading and lagging edges (fast rise and fall times). If they are lacking in any one of these qualities, they will not properly perform their assigned tasks.

Signal amplification is usually the way to ensure that a signal has proper amplitude, but ordinary amplification circuits are usable only with difficulty, since they tend to degrade the desired sharp shape of the signals and to otherwise distort them, to a degree more or less directly related to the degree of amplification, Another source of trouble is the usually capacitive nature of the load on the clock pulse supply represented by the input of the logic circuits, which constitutes means by which the logic circuit output signal feeds back to the clock pulse circuitry and combines with the clock pulse itself, and which additionally tends to delay the action of the signals on the logic circuit, thus requiring an exceptionally short rise and fall time in the clock signals.

In the operation of a computer, which may include as many as 500 clock pulse amplifiers in a single computer system, it is highly desirable for the operation of the clock pulse amplifier circuits to operate with a minimum power dissipation in order not only to reduce the cost of operation, but also to minimize the heat produced by that power dissipation, and make unnecessary any external cooling systems.

Specially designed pulse amplifiers have been interposed between the source of clock pulses and the logic circuits which receive the amplified clock pulses. A major drawback in these known pulse level amplifiers is that they continuously dissipate power and thus operate with excessive power consumption (an important factor where the computers are battery powered) and develop excessive heat production which must be suitably controlled so as not to damage the operation of the semiconductor switching devices used in the computer. The known amplifiers of this type are also often unable to operate at the required speed of response for high frequency clock pulse operation and often do not provide adequate isolation or buffering between the controlled logic circuits and the source of the clock pulses. Furthermore, it is not always possible for the known clock pulse amplifiers to produce output pulses of the required current or energy levels which also have sufficiently fast rise and fall times.

It is therefore an object of the present invention to provide a clock pulse amplifier circuit in which the power dissipation is reduced.

It is a further object of this invention to provide a clock pulse amplifier which is capable of operating at high frequencies and in which the output pulse shape is suitable for accurate control of logic circuits.

It is yet another object of the present invention to provide such an amplifier in which effective isolation is provided between the source of clock pulses and the externally controlled logic circuit inputs.

It is more specific object of the present invention to provide a clock pulse amplifier which dissipates power only during transient periods corresponding to the rise and fall times of the input clock pulse, and which dissipates no power in the period between the leading and the trailing edges of the output pulses generated by the amplifier.

It is a further object of the present invention to provide a clock pulse amplifier in which the signal levels of the output clock pulse are accurately determined and in which the rise and fall times of the output pulses are short and substantially equal.

A particular object of the present invention is to produce circuitry of the type described which is adapted for use with logic circuitry of the MOS type and with systems using a wide variety of voltage sources and logic levels.

To these ends, the present invention provides a clock pulse amplifier circuit in which a switching circuit is provided between an input node which receives the externally generated input clock signals and a signal node. Means are provided to derive first and second transient signals from the leading and trailing edges respectively of the input pulse signal and means are provided to render the switching circuit conductive only during portions of the transient signals. During the two periods of conduction of the switching circuit the signal node is charged to one level and then to another level. During the periods of nonconduction of the switching circuit, the level at the signal node remains at the level to which it had previously been charged. It will be appreciated that the circuit of this invention dissipates power only during the transient conducting periods which are controlled by signals corresponding to the leading and trailing edges of the input signal. The switching circuit dissipates no quiescent DC power.

The switching circuit, in the specific embodiment herein disclosed, comprises two switching stages each having a control input to which said transient signals are applied. The outputs of each switching stage are respectively operatively connected between the signal node and a pair of voltage sources at different voltage levels. Each switching stage is respectively rendered conductive by one of the transient signals respectively derived from the rise and fall times of the input pulses. That is, one of the switching stages is rendered conductive during the first transient signal to charge the signal node to its first level, that switching stage then becoming nonconductive, but the signal node remaining at that level until the second transient signal renders the other switching stage conductive, the latter switching stage then being effective to charge the signal node to its second signal level. Thereafter, said other switching stage becomes nonconductive, but the signal node remains at its new level until the next first transient signal starts the cycle over again.

The two switching stages each comprises a transistor, one being of the PNP type and the other being of the NPN type as here specifically disclosed. The base-collector junctions of these transistors define clamping diodes operatively between the signal node and said sources of potential so that at appropriate times when said junctions are biased in an appropriate direction, the charge at the signal node is clamped between its two signal levels corresponding to the levels of the potential sources.

The quiescent potential levels at the switching stages are maintained by diode means connected between said control inputs and said potential sources. Said diode means, which as herein disclosed comprise conventional switching diodes as well as diodes defined by the base-emitter junctions of the switching stage transistors, are effective to limit the potential swing at the switching stage control inputs. As a result, the quiescent DC levels at said control inputs will be at appropriate levels when the subsequent input transient signal is applied thereto, thereby to reliably turn on the transistor in that switching stage. Furthermore, by limiting the quiescent potential swing at these inputs, a relatively small input signal will be effective to turn on the switching stages, thereby providing a very rapid response of the switching stages to the input signal.

The signal node is operatively connected to an output node by means of a current amplifier, that amplifier also comprising a pair of transistors the base-collector junctions of which define a second pair of clamping diodes respectively tied to each of the potential sources, thereby to provide an additional device to clamp the signal level at the signal node at its two operative levels. That current amplifier further serves to provide isolation between the signal node and output node and to provide a reduced output impedance at the output node.

A positive feedback potential is operatively connected between the output node and the input of each of the switching stages during the period in which the output node is charging to one of its operating levels, thereby to increase the speed at which the signal node and thus the output node are charged to their respective operating levels.

Figures 2A, 2B, 2C, 2D:
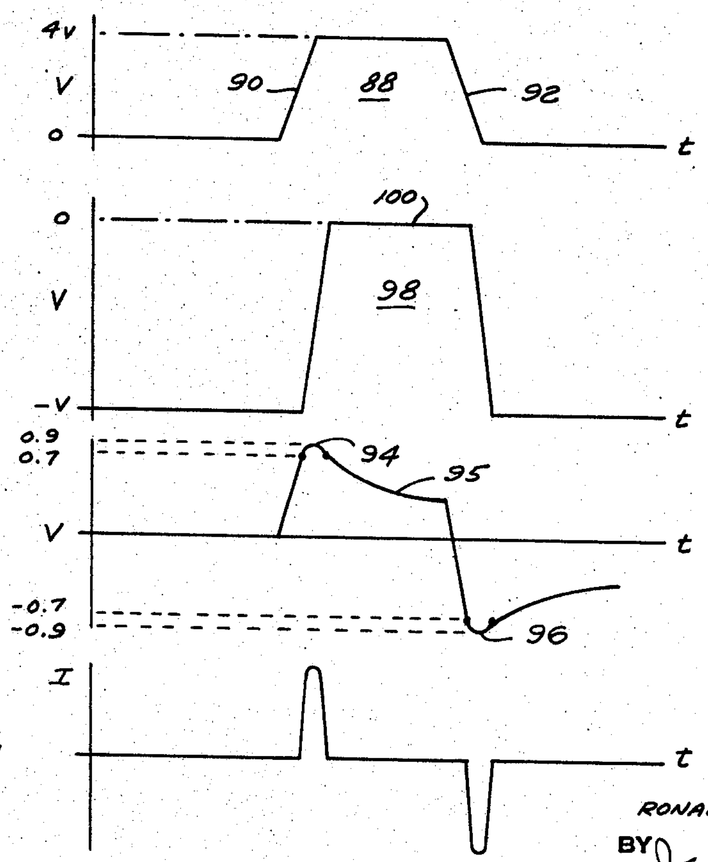

To the accomplishment of the above, and to such other objects as may hereinafter appear, the present invention relates to a clock pulse amplifier circuit as defined in the accompanying claims and as described in this specification, taken together with the accompanying drawing in which:

FIG. 1 is a schematic diagram of the clock pulse amplifier circuit of this invention;

FIG. 2*a* is a timing diagram of a typical input pulse to the circuit of FIG. 1;

FIG. 2*b* is a timing diagram of the output pulse generated by the circuit of FIG. 1 from the input pulse of FIG. 2*a*;

FIG. 2*c* is a timing diagram illustrating the wave form of the differentiated input signal applied at the inputs of the switching stages of the circuit of FIG.

FIG. 2*d* is a current timing diagram of the output current of the circuit of FIG. 1.

The pulse amplifier circuit of this invention generally designated 10 comprises an input node 12, a signal node 14 and an output node 16. The input node 12 is operatively connected to signal node 14 through a pair of normally nonconducting switching stages generally designated 18 and 20 which, in the embodiment herein specifically described, comprise respectively a PNP transistor 22 and an NPN transistor 24. Transistors 22 and 24 each comprise the conventional base, emitter and collector terminals as indicated in FIG. 1 according to the well known representation. The input node 12, which is adapted to have the input pulse signal applied thereto, is operatively connected to the control input nodes 28 and 30 of switching stages 18 and 20 respectively through an input circuit generally designated 26 which is effective to sense the leading and trailing edges of the input pulse and to develop first and second transient signals respectively. Those transient signals are applied to the switching stage control inputs nodes 28 and 30 in a manner such that each of the switching stages are alternately rendered conductive thereby. When the switching stages are thus rendered alternately conductive, they are alternately effective to charge an equivalent capacitor 32, connected between signal node 14 and ground, between two signal levels corresponding to, but not necessary equal to, the levels of potential sources at source points 34 and 36 which have potential values, as herein shown, of zero volts (ground) and −V volts. Means are provided in the circuit 10 for maintaining the level at signal node 14 at its two desired charging levels so that the signal developed at output node 16, which is operatively connected to signal node 14 through an output circuit generally designated 38, will be in the shape of a pulse having its upper and lower potential levels corresponding to the upper and lower charging levels of the signal developed at signal node 14.

In the particular embodiment of the circuit of this invention as herein specifically described, the transistor 22 of switching stage 18 has its emitter directly connected to control input node 28, which node is also connected to the cathode of a switching diode 40. The base of transistor 22 and the anode of diode 40 are connected together at a point 42, which in turn is connected to the grounded voltage source point 34. The collector of transistor 22 is connected to a point 44 which in turn is connected to the signal node 14. Transistor 24 of switching stage 20 has its emitter connected to input control node 30 which is connected to the anode of a switching diode 46, the cathode of that diode being connected to the base of transistor 24 at point 48, which in turn is connected to potential source point 36. The collector of transistor 24 is connected to a point 50 which also is connected to signal node 14.

The input circuit 26 comprises a pair of complementary transistors 52 and 54, transistor 52 being of the NPN type and transistors 54 being of the PNP type. The bases of transistors 52 and 54 are each tied to a common point 56 which is in turn connected to input node 12. The collectors of transistors 52 and 54 are respectively connected to suitable sources 58 and 60 of positive and negative potential. The emitters of transistors 52 and 54 are tied together by line 62 and are connected to input control nodes 28 and 30 by coupling and differentiating capacitors 64 and 66 respectively.

The output circuit 38 comprises a pair of complementary transistors 68 and 70, transistor 68 being of the NPN type and transistor 70 being of the PNP type, each being connected in the common collector configuration. The emitters of these transistors are connected to one another at a point 72 which is connected to output node 16, an output capacitance 74 being connected between output node 16 and ground at point 76. The base terminals of transistors 68 and 70 are connected respectively to points 44 and 50 and are each thus connected to signal node 14. The collectors of transistors 68 and 70 are respectively connected to potential source points 34 and 36 and thus to the two potential sources of ground and −V volts.

Point 72, and thus output node 16, is connected by means of a line 78 to a point 80 which is respectively connected to switching stage control input nodes 28 and 30 by means of capacitors 82 and 84 respectively. A filtering capacitor 86 is connected between source point 36 and ground to prevent external noise from feeding through to the −V line.

A typical input pulse 88 applied at input node 12 is shown in FIG. 2*a*, that pulse being shown as having an excursion of 0 to 4 volts, and having a leading edge 90 and a trailing edge 92 each of which typically has a duration in the range of 5—10 nanoseconds (nsec.). To couple the input pulse 88 from input node 12 through input stage 26 and to the control input nodes 28 and 30 of switching stages 18 and 22, the potential at point 58 should be more positive than 4 volts and the potential at point 60 should be more negative than ground. Transistors 52 and 54 thus form a pair of complementary emitter followers which provide DC isolation between the source of the input pulse (not shown) and the coupling capacitors 64 and 66. These capacitors, together with the resistances of the emitter-base circuits of transistors 22 and 24 respectively, form a pair of differentiating circuits which operate on the pulse outputs of input circuit 26 to derive and apply at control input nodes 28 and 30 the signal shown in FIG. 2*c*. That signal comprises first and second transient signals at 94 and 96 derived respectively from the leading and trailing edges 90 and 92 of input pulse 88.

Looking first at the operation of switching stage 18, the presence of the positive transient signal 94 at input node 28 will reverse or back bias diode 40 and will develop at input node 28 a positive potential sufficient to turn on transistors 22. (In the absence of that signal at node 28 transistor 22 will be cut off because its base and emitter terminals are both substantially at the same potential.) Transistor 22 will conduct only after the magnitude of the positive transient signal 94 at input node 28 reaches that level which will establish a suitable positive potential at the emitter of transistor 22 with respect to its base, the latter being tied to ground at source point 34. When transistor 22 is turned on, current will flow between the emitter and collector and that current will be applied to the capacitor 32 to charge the latter. Capacitor 32 will continue to charge until the diodes defined by the base-collector junctions of transistors 22 and 68 become forward biased as a result of the potential difference between signal node 14 and source point 34. At that time signal node 14 will be operatively connected to source point 34 through the now conducting diodes, thus producing a clamping action effective to prevent the signal at signal node 14 from exceeding a level of approximately 0.7 volts above source point 34, which, as here specifically disclosed, is at ground.

The presence of the positive transient signal 94 at control input node 30 of switching stage 20 forward biases diode 46, thereby connecting control input node 30 to source point 36. Since the emitter of transistor 24 is at this time more positive than its base, transistor 24, being of an NPN configuration, will remain in its off or nonconducting state in which it dissipates no power.

When the signal level at control input node 28 developed by the application thereat of the transient signal 94 decreases as at 95 so that the emitter-to-base potential at transistor 22 is less than the required turn-on voltage of approximately 0.7 volts for transistor 22, that transistor will be turned off. Transient signal 94 will fall to that reduced level approximately 5—10 nsec. after that signal has caused transistor 22 to be turned on. Neither transistor 22 or transistor 24 will then be conducting, and since there is no direct path for the charge on capacitor 32 to discharge, it will remain charged to that positive (ground) potential to which it was charged during the conducting period of transistor 22.

The presence of the negative transient 96 at control input nodes 28 and 30 produces a reverse effect on the switching stages 18 and 20 to that described above. Diode 46 is reverse biased and the emitter of transistor 24 connected to input node 30 becomes sufficiently negative with respect to its base as transient signal 96 exceeds −0.7 volts, so that transistor 24 begins to conduct. This conduction causes current to flow from the capacitor 32 through the collector and emitter of transistor 24 node 14 thereby discharging capacitor 32 and bringing signal node 14 toward a level of approximately 0.7 volts more negative than the potential −V at a source point 36. If the potential at signal node 14 tends to exceed that negative level, the diodes defined by the base-collector junctions of transistors 24 and 70 become conductive, thus effectively clamping signal node 14 to a maximum negative level of 0.7 volts more negative than −V volts.

The output circuit 38 comprising transistors 68 and 70 serves to provide current amplification of the signal at signal node 14 and to transfer that signal to output node 16. Transistors 68 and 70 are each connected in the common collector configuration and thus define complementary emitter followers providing a current gain and a voltage drop (voltage gain of less than unity) so that the output pulse 98, as shown in FIG. 2*b*—, will have a maximum positive level at ground and a negative level of −V volts, the levels of the potentials at source points 34 and 36, there being voltage drops of 0.7 volts across the base-emitter paths of transistors 68 and 70. By establishing the potential levels at source points 34, 36, the two operative levels of the output pulse can be set to any desired levels, limited only by the breakdown voltages of the transistors 22, 24, 68 and 70 in circuit 10, thus greatly increasing the flexibility of circuit operation by permitting, within a prescribed range, any desired amount of amplification of the input pulse level.

During the transfer of the signal from signal node 14 to output node 16 through output circuit 38, that is, during the transient conducting conditions of transistors 22 and 24, base current will flow either in transistor 68 or transistor 70 according to the direction or polarity to which signal node 14 is charging, causing some discharge from capacitor 32. In order to compensate for this reduction in charge, the signal at output node 16 is fed back through the capacitors 82 and 84 respectively to the switching stage control input nodes 28 and 30. This positive feedback restores current to nodes 28 and 30 and thus increases the current flow through transistors 22 and 24 during their respective periods of conduction to charge capacitor 32. The presence of the feedback current at the switching stage inputs also has the effect of increasing the periods of conduction of transistors 22 and 24 by maintaining the potential at nodes 28 and 30 at or above the turn on voltage for transistors 22 and 24 for a longer time than if these feedback currents were not provided. The positive feedback current is only supplied to the switching stage input nodes 28, 30 in the periods that the voltages on output capacitor 74 and capacitor 32 are changing, that is, when these capacitors are charging to one of their two operative levels. The wave form of the charging current in capacitor 74 is shown in FIG. 2*d* wherein it is seen that that current flows only when the potential at output node 16 is charging to one or the other of its operative levels. No output current flows in the interval between these charging periods. During the stable portion 100 of the output pulse 98 no feedback current will flow, and neither transistor 22 or 24 will be conducting.

The diodes 40 and 46 along with the base-emitter diodes of transistors 22 and 24 are effective to effective to limit the maximum potential swing at input nodes 28 and 30 at quiescent conditions, that is, in the nonconducting periods of transistors 22 and 24 corresponding to the absence of operative positive and negative transient signals 94 and 96. Thus, if the quiescent or DC level at node 28 tends to drift more positive than approximately 0.7 volts, the diode defined by the base-emitter junction of transistor 22 will become forward biased and conductive, thus connecting node 28 to source point 34, and thus to ground. Conversely, if the quiescent voltage at node 28 would tend to drift more negatively than −0.7 volts, diode 40 would become forward biased and thus operatively connect node 28 to source point 34 and ground. In this manner, the maximum quiescent excursion of the potential level at input node 28 will be approximately 1.4 volts. By a similar analysis it will be apparent from the clamping action of diode 46 and the base-emitter diode of transistor 24, that the quiescent potential at node 30 will be able to swing only between −V±0.7 volts, so that the maximum excursion at that node will be again approximately 1.4 volts. Thus, an overall swing in the input transient signals applied to these input nodes of approximately only 1.4 volts from maximum to maximum in opposite directions is required to change the level or state of the output pulse 98. As a result the amplifier circuit 10 is responsive to relative to relatively small variations in the magnitude of the input pulse signal. If such a clamping action were not provided it would be possible for the input nodes to drift toward either positive or negative levels at which they would not respond to an input signal to turn on their associated switching stages.

In One embodiment in which the capacitors 64 and 66 have capacitance values of about 200 pf., 4-volt input signals are converted into 40 volts output signals which can be fed into a 100 pf. load with rise and fall times of less than 10 nsec.

The circuit of this invention has thus provided a pulse amplifier in which no DC power is dissipated (other than that in the input stage 26, which may be eliminated if the input pulse contains sufficient current to drive the two switching stages) and in which power is dissipated in only the relatively short periods of conduction of the switching stages. The switching stages are rendered conductive as a result of transient signals derived from the leading and trailing edges of the input pulse. For high frequency pulses in the order of 20 megacycles this will result in power dissipation during approximately 60 percent of the time assuming an overall pulse width of 50 nsec. and leading and trailing edges of 15 nsec. However, for lower frequency rates in the order of 100 kc., the power dissipation duty period will be significantly lower than this (approximately one percent) and the saving on power will be substantial. In a typical computer system in which as many as 500 of such pulse amplifiers are employed the overall saving on power dissipation and reduced cooling requirements are indeed significant. The circuit of this invention provides great flexibility in the types of input pulses which can be amplified and in the nature of the load impedance of the load circuits and the input pulse source circuits. Accordingly, the circuit can be used in a great variety of applications requiring the amplification of pulses and pulse trains. The circuit requires a relatively small number of components which can be readily packaged on a single chip semiconductor material and is thus readily employed is systems having low space, cost and power requirements.

While only a single embodiment of this invention has been herein specifically disclosed, it will be apparent that variations may be made thereto without departing from the spirit and scope of the invention as defined in the following claims:

I claim:

1. A circuit for amplifying a step function type input signal having leading and trailing edges, said circuit comprising an input node adapted to have said input signal applied thereto, a signal node, first and second sources respectively of first and second source levels, normally nonconductive switching means connected between said first and second sources respectively and said signal node, said switching means having a control input, input means operatively connected to said input node and effective to derive first and second transient signals from the leading and trailing edges respectively of said input signal, means operatively connecting said input means to said control input of said switching means and effective to render said switching means conductive between said first source and said signal node substantially only during periods corresponding to said first transient said second and to render said switching means conductive between said second source and said signal node substantially only during periods corresponding to said second transient signal, said signal node being charged respectively towards said first and second source levels in the conductive periods of said switching means corresponding to said first and second transient signals respectively, and means operatively connected to said signal node and effective to maintain said node, during the time that said switching means is nonconductive, substantially at the level to which it has been previously charged.

2. The circuit of claim 1, in which said switching means comprises first and second switching stages connected to said first and second switching stages connected to said first and second sources respectively, said means rendering said switching means conductive comprising means effective alternately to cause said first switching stage to be conductive during at least a portion of said second transient signal.

3. The circuit of claim 2, further comprising means operatively connected to said switching means and effective to limit the quiescent potential applied to said switching means by said first and second sources to values not exceeding one or the other of two operative levels related to said first and second source levels respectively.

4. The circuit of claim 1, further comprising means operatively connected to said switching means and effective to limit the quiescent potential applied to said switching means by said first and second sources to values not exceeding one or the other of two operative levels related to said first and second source levels respectively.

5. A signal transfer circuit for use with an input signal having a positive and a negative going portion, said circuit comprising an input node adapted to have said input signal applied thereto, a signal node, first and second potential sources at different levels respectively, first and second normally on nonconducting switching stages each having a control input and operatively connected between said signal node and said first and second potential sources respectively, and means operatively connecting said input node to said control input of said switching stages, said first switching stage comprising first signal-sensitive means effective in response the positive-going portion of said input signal to render said first switching stage first conductive and then nonconductive, thereby to charge said signal node to a first level corresponding to said first potential source, said second switching stage comprising second signal-sensitive means effective in response to the negative-going portion of said input signal to render said second switching stage first conductive and then nonconductive, thereby to charge said signal node to a second level corresponding to said second signal source, and means operatively connected to said signal node and effective to maintain it at one or another of a pair of desired levels when said switching stages are nonconductive.

6. The circuit of claim 5, in which said means operatively connecting said input node to said control inputs of said switching stages comprises means for deriving first and second transient signals from said positive and negative going portions respectively and applying them to said control inputs of said first and second switching stages respectively, said transient signals having peak levels and then reduced levels, said peak levels being effective to render conductive said first and second switching stages respectively, and said reduced levels being effective to return said switching stages to their nonconducting states.

7. The circuit of claim 6, in which said signal deriving means comprises means for deriving a signal corresponding to the approximate differential of said input signal.

8. The circuit of claim 6, in which said level maintaining means comprises diode means respectively operatively connected between said first and second sources and said signal node.

9. The circuit of claim 5, in which said level maintaining means comprises diode means respectively operatively connected between said first and second sources and said signal node.

10. The circuit of claim 6, further comprising an output node, and output means operatively connecting said signal node to said output node, said output means also comprising means operatively connected to said first and second potential sources effective to clamp the signal at said signal node at said first and second levels.

11. The circuit of claim 10, in which said output means comprises transistor means, said clamping means comprising diode means defined by a PN junction of said transistor means.

12. The circuit of claim 10, further comprising feedback means operatively connected between said output node and said switching stages.

13. The circuit of claim 12, in which said feedback means comprises first and second capacitance means connected at one end to one another and to said output node, the other ends of said capacitance means being respectively operatively connected to said switching stage control inputs.

14. The circuit of claim 5, further comprising an output node, and output means operatively connecting said signal node to said output node, said output means also comprising means operatively connected to said first and second potential sources effective to clamp the signal at said signal node at said first and second levels.

15. The circuit of claim 14, in which said output means comprises transistor means, said clamping means comprising diode means defined by a PN junction of said transistor means.

16. The circuit of claim 14, further comprising feedback means operatively connected between said output node and said switching stages.

17. The circuit of claim 16, in which said feedback means comprises first and second capacitance means connected at one end to one another and to said output node, the other ends of said capacitance means being respectively operatively connected to said switching stage control inputs.

18. The circuit of claim 5, in which said switching stages comprise transistors having base, emitter and collector terminals, said base terminal terminals being connected to said respective sources, said emitter terminals being connected to said control inputs of said switching stages, said collectors being connected to said signal node, and diode means connected between said base and emitter terminals of said transistors.

19. The circuit of claim 18, in which said means operatively connecting said input node to said control inputs of said switching stages comprises means for deriving first and second transient signals from said positive and negative going portions respectively and applying them to said control inputs of said first and second switching stages respectively, said transient signals having peak levels and then reduced levels, said peak levels being effective to render conductive said first and second switching stages respectively, and said reduced levels being effective to return said switching stages to their nonconducting states.

20. The circuit of claim 18, further comprising an output node, and output means operatively connecting said signal node to said output node, said output means also comprising means operatively connected to said first and second potential sources effective to clamp the signal at said signal node at said first and second levels.

21. The circuit of claim 9, further comprising an output node, and output means operatively connecting said signal node to said output node, said output means also comprising means operatively connected to said first and second potential sources effective to clamp the signal at said signal node at said first and second levels.

22. The circuit of claim 21, in which said output means comprises transistor means, said clamping means comprising diode means defined by a PN junction of said transistor means.

23. The circuit of claim 22, further comprising feedback means operatively connected between said output node and said switching stages.

24. The circuit of claim 23, in which said feedback means comprises first and second capacitance means connected at one end to one another and to said output node, the other ends of said capacitance means being respectively operatively connected to said switching stage control inputs.